US010444488B2

(12) United States Patent
Miner et al.

(10) Patent No.: US 10,444,488 B2
(45) Date of Patent: Oct. 15, 2019

(54) OPTICAL BEAM STEERING DEVICES HAVING ELECTRICALLY CONDUCTIVE FLUIDS THEREIN AND METHODS OF OPERATING SAME

(71) Applicant: Mirada Technologies Inc., San Francisco, CA (US)

(72) Inventors: Andrew Carl Miner, San Francisco, CA (US); Jonathan King Mapel, San Francisco, CA (US)

(73) Assignee: Mirada Technologies Inc., San Francisco, CA (US)

( * ) Notice: Subject to any disclaimer, the term of this patent is extended or adjusted under 35 U.S.C. 154(b) by 11 days.

(21) Appl. No.: 15/897,977

(22) Filed: Feb. 15, 2018

(65) Prior Publication Data

US 2018/0246315 A1    Aug. 30, 2018

Related U.S. Application Data

(60) Provisional application No. 62/600,577, filed on Feb. 24, 2017, provisional application No. 62/603,175, filed on May 20, 2017, provisional application No. 62/577,329, filed on Oct. 26, 2017.

(51) Int. Cl.
*G02B 26/00* (2006.01)
*G02B 26/08* (2006.01)

(52) U.S. Cl.
CPC ....... *G02B 26/004* (2013.01); *G02B 26/0816* (2013.01)

(58) Field of Classification Search
CPC . G02B 26/004; G02B 26/005; G02B 26/0816

USPC ........................................................ 359/226.3
See application file for complete search history.

(56) References Cited

U.S. PATENT DOCUMENTS

| | | | |
|---|---|---|---|
| 2002/0135908 A1* | 9/2002 | Ryutov | G02B 1/06 359/846 |
| 2003/0202265 A1 | 10/2003 | Reboa et al. | |
| 2004/0160684 A1* | 8/2004 | Prins | G02B 26/005 359/832 |

(Continued)

OTHER PUBLICATIONS

"Optical tests of nanoengineered liquid mirrors", Applied Optics, vol. 42, No. 10, Apr. 1, 2003, pp. 1882-1887.*

(Continued)

*Primary Examiner* — Frank G Font
(74) *Attorney, Agent, or Firm* — Myers Bigel, P.A.

(57) ABSTRACT

An optical beam steering device can include a first electrically conductive fluid having an optically reflective surface thereon, and this first electrically conductive fluid may include a material that deforms in response to application of a first magnetic field and/or first electric field thereto. This first electrically conductive fluid may be an optically reflective material. The optically reflective surface may at least partially cover a non-fluid substrate that maintains its shape in response to the application of the first magnetic field and/or first electric field. A sealed package may be provided, which includes the optical beam steering device, and the first electrically conductive fluid, the non-fluid substrate and an ambient within the package may be collectively configured to yield a substantially neutrally buoyant condition therein.

15 Claims, 13 Drawing Sheets

(56) References Cited

U.S. PATENT DOCUMENTS

| | | | |
|---|---|---|---|
| 2008/0186709 A1* | 8/2008 | Kuiper | G02B 3/14 |
| | | | 362/277 |
| 2008/0310031 A1 | 12/2008 | Mohr et al. | |
| 2011/0181852 A1 | 7/2011 | Bleidistel et al. | |
| 2011/0182621 A1 | 7/2011 | Hirakawa | |
| 2012/0007778 A1 | 1/2012 | Duwel et al. | |
| 2013/0278907 A1 | 10/2013 | Abele et al. | |
| 2014/0239628 A1* | 8/2014 | MacPherson | B82Y 20/00 |
| | | | 283/67 |
| 2015/0130996 A1* | 5/2015 | Chang | H04N 5/238 |
| | | | 348/370 |
| 2016/0091708 A1* | 3/2016 | Tuley | G02B 26/004 |
| | | | 359/295 |

OTHER PUBLICATIONS

Notification of Transmittal of the International Search Report and the Written Opinion of the International Searching Authority, or the Declaration, for corresponding U.S. International Application No. PCT/US18/19132, dated May 21, 2018, 15 pp.

Notification of Transmittal of the International Search Report and the Written Opinion of the International Searching Authority, or the Declaration, for corresponding U.S. International Application No. PCT/US18/33363, dated Aug. 10, 2018, 10 pages.

* cited by examiner

1100

OPTICAL BEAM STEERING DEVICES HAVING ELECTRICALLY CONDUCTIVE FLUIDS THEREIN AND METHODS OF OPERATING SAME

REFERENCE TO PRIORITY APPLICATIONS

This application claims priority to U.S. Provisional Application Ser. No. 62/600,577, filed Feb. 24, 2017, U.S. Provisional Application Ser. No. 62/603,175, filed May 20, 2017 and U.S. Provisional Application Ser. No. 62/577,329, filed Oct. 26, 2017, the disclosures of which are hereby incorporated herein by reference.

FIELD OF THE INVENTION

The invention relates to directing beams of light in specific directions using movable reflective surfaces.

BACKGROUND OF THE INVENTION

Directing beams of light in specific directions has many applications, and many technologies exist that can accomplish this task. Light, also known as radiation may be composed of a broad distribution of wavelengths, such as white light, or may be a very narrow band of wavelengths, such as produced from a typical laser. The wavelengths that compose light may be in the visible range, detectable by our eyes, or outside the visible range. Light just beyond the visible range on the long wavelength side of the spectrum is known as infra-red radiation. Light just beyond the visible range on the short wavelength side of the spectrum is known as ultra-violet.

Beams of light may be directed by various means, but directing light by means of a reflecting, movable surface, or mirror, is the most relevant to the present invention. A technology that can provide a reflective surface, and move that reflective surface in a controlled, high speed manner can find application in uses such as microscopy, projection displays, laser sensors, and similar technologies.

There are a number of actuation technologies known in the prior art, when coupled to reflective mirrors provide controlled beam steering.

There are a variety of methods for actuation that utilize electromagnetic effects. One method of directing light in a controlled manner at high speeds uses an electromagnetic device known as a galvanometer. This technology uses permanent magnets and/or ferromagnetic materials with electrical coils. Electrical current driven through the device initiates motion that can be controlled in a closed loop or open loop manner. This actuation technology coupled to a mirror can provide a high speed mechanism to control and direct light.

It has been observed that galvanometer based technology consume significant electrical power under operation, making them incompatible for applications where electrical power is constrained. It has been further observed that the mechanical complexity of the construction of galvanometer technology limits the ability to miniaturize this technology at low cost.

Light can also be directed in a controlled manner using mirror systems driven by voice coil motors. Voice coil motors are a simple electrical device, which are similar to a galvanometer, and sometimes also called a solenoid. Electrical energy applied to the windings drives a core linearly, driven by magnetic repulsion. Voice coil motors coupled to the edges of a mirror can be actuated in a controlled manner to tilt the mirror and effectively direct light.

It has been observed that voice coil mirror systems consume significant amounts of electrical power, and given that they have multiple parts including fine electrical windings, they are difficult to miniaturize at low cost.

Another technology that uses reflective surfaces for directing light in a controlled manner is electrostatic actuation. This technology uses that fact that when voltage is applied across two surfaces at close proximity, positive and negative charges collect on the respective surface, and an attractive force is generated. This actuation effect can applied in a beam steering technology by using the force generated, and the resulting motion of attractive surfaces to change the angle of a mirror.

It has been observed that electrostatic actuation results in small movements, which in turn, even when mechanically amplified into larger angles, results in modest angles of motion in the mirror.

Piezoelectric effects also can be coupled to a mirror for beam steering. Certain materials expand when subject to high voltages, in a process known as the piezoelectric effect. It has been observed that mirror systems driven by piezoelectric effects, similar to electrostatic actuators, deliver multiple angles of motion in the mirrors.

Electrothermal actuation can be used to drive controlled angular deflection in mirrors. This class of device takes advantage of the fact that most materials expand in length when heated. By careful design, electrical power can be dissipated selectively in electrothermal actuators to produce bending or linear extension. This motion can then be coupled with mirrors to deliver a beam steering effect.

It has been observed that electrothermal actuators are relatively slow, and do not produce high speed precision motion relative to other technologies. Additionally, they typically consume significant electrical power in order to generate the high temperatures in regions of the actuators. In order to produce high temperatures and the associated thermal expansion more efficiently, some package the actuators in vacuum or low thermal conductivity gases, adding to the cost of the product.

The aforementioned actuation technologies that allow for the controlled steering of light can be realized using several different manufacturing technologies. These technologies can be manufactured by traditional means, including machining, electrical winding, and hand assembly. Additionally, these beam steering technologies can be realized using semiconductor-like fabrication technologies, known as Micro-Electro-Mechanical Systems (MEMS).

As these devices are miniaturized, typically the actuation speeds that can be realized increase. It has been observed that traditional manufacturing methods do not scale down to small sized cost effectively. MEMS manufacturing technology has the capability of forming high precision mechanical structures at sub mm scales, but it has been observed that the beam steering devices manufactured using MEMS fabrication, even when produced on large silicon wafer, do not achieve sufficiently low cost in high production volume. This is generally due to the complexity of each manufacturing step, the number of manufacturing steps, and the complex equipment used.

SUMMARY OF THE INVENTION

Optical beam steering devices according to embodiments of the invention include a first electrically conductive fluid having an optically reflective surface thereon. This first electrically conductive fluid may be an optically reflective material that deforms in response to application of a first magnetic field and/or first electric field thereto. In some embodiments of the invention, the optically reflective surface at least partially covers a non-fluid substrate, which maintains its shape in response to the application of the first magnetic field and/or first electric field.

According to additional embodiments of the invention, a second electrically conductive fluid may be provided adjacent the first electrically conductive fluid, and this second electrically conductive fluid may have a shape that deforms in response to application of a second magnetic field and/or second electric field thereto. The non-fluid substrate may also extend on the first and second electrically conductive fluids.

According to further embodiments of the invention, the non-fluid substrate extends on the first electrically conductive fluid, and the first electrically conductive fluid, the non-fluid substrate and the optically reflective surface operate collectively as an at least 2-axis controlled mirror responsive to the first magnetic field and/or first electric field. The non-fluid substrate may be selected from a group consisting of polished metals and substrates having one or more optically reflective materials thereon. The optical beam steering device may also include an electrically insulating substrate having the first electrically conductive fluid thereon, and a plurality of electrodes may be provided, which are electrically coupled to the first electrically conductive fluid.

In additional embodiments of the invention, the first electrically conductive fluid is provided in a sealed package, which includes a lens/window therein. This lens/window can be configured to support passage of incident and reflected light to and from the optically reflective surface. A sealed packaged may also be provided, which contains the first electrically conductive fluid and the non-fluid substrate (having the optically reflective surface thereon). In addition, an ambient may be provided within the package that at least partially surrounds the first electrically conductive fluid and the non-fluid substrate. Preferably, the first electrically conductive fluid, the non-fluid substrate (having the optically reflective surface thereon) and the ambient are collectively configured to yield a substantially neutrally buoyant condition between components within the sealed package. For example, the non-fluid substrate may be configured to have an effective density within ±30% of an effective density of the first electrically conductive fluid. And, in some embodiments of the invention, the non-fluid substrate may be shaped and sized within the ambient to have an effective density within ±20% of an effective density of the first electrically conductive fluid.

According to still further embodiments of the invention, an optical beam steering device may be provided with an electrically insulating substrate having the first electrically conductive fluid thereon. In addition, at least one inductive coil may be provided on the electrically insulating substrate. This at least one inductive coil may extend opposite the first electrically conductive fluid. The at least one inductive coil may be configured as a plurality of independently-controllable inductive coils extending opposite respective portions of the first electrically conductive fluid. Moreover, in the event the electrically insulating substrate has first and second spaced-apart electrically conductive fluids thereon, then first and second inductive coils may be provide on the electrically insulating substrate, opposite respective ones of the first and second electrically conductive fluids.

According to still further embodiments of the invention, an optical beam steering device is provided, which includes a substrate having at least one electrically conductive fluid thereon that deforms in response to a concurrent application of a magnetic field and electric current thereto. This at least one electrically conductive fluid may include a material having an optically reflective surface thereon. A sealed package may also be provided, which contains the at least one electrically conductive fluid. This sealed package may include a lens/window, which is configured to support passage of incident light to the at least one electrically conductive fluid. At least one inductive coil may also be provided on the substrate, which extends opposite the at least one electrically conductive fluid. The at least one electrically conductive fluid may include a material selected from a group consisting of gallium, alloys comprising gallium, and alkali metals comprising sodium and potassium. According to preferred aspects of these embodiments of the invention, the at least one electrically conductive fluid and an ambient within the sealed package that at least partially surrounds the at least one electrically conductive fluid are collectively configured to yield a substantially neutrally buoyant condition between components within the sealed package. For example, the at least partially surrounding ambient may be configured to have an effective density within ±20% of an effective density of the at least one electrically conductive fluid.

According to still further embodiments of the invention, an optical beam steering device is provided, which includes a substrate having a recess therein and an electrically conductive fluid at least partially filling the recess. The electrically conductive fluid may be a material that deforms in response to application of a first magnetic field and/or first electric field thereto. A mirror may also be provided on an exposed surface of the electrically conductive fluid. The electrically conductive fluid and the mirror can be collectively configured to operate as an at least 2-axis controlled mirror responsive to the first magnetic field and/or the first electric field. The electrically conductive fluid may be a material selected from a group consisting of gallium, alloys comprising gallium, and alkali metals comprising sodium and potassium.

BRIEF DESCRIPTION OF THE DRAWINGS

The accompanying drawings, which are incorporated in and form a part of this specification, illustrate various embodiments of the invention and, together with the description, serve to explain the principles of the invention.

DETAILED DESCRIPTION OF THE INVENTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components may not have been described in detail as not to unnecessarily obscure aspects of the present invention.

The present invention enables the control of a reflective surface or mirror, enabling the redirection of an incident beam of light. The underlying physical mechanism that enables this redirection is based on the interactions of magnetic fields, electrical current, and electrically conducting fluids. This field of study is known as magneto-fluid-dynamics, or more commonly, Magneto-Hydro-Dynamics (MHD). Although the term hydro most commonly refers to water, in the field of MHD the term refers to the study of the behavior of all fluids, gasses, and plasma that exhibit motion in response to magnetic fields and/or electrical currents.

Figure 1A:
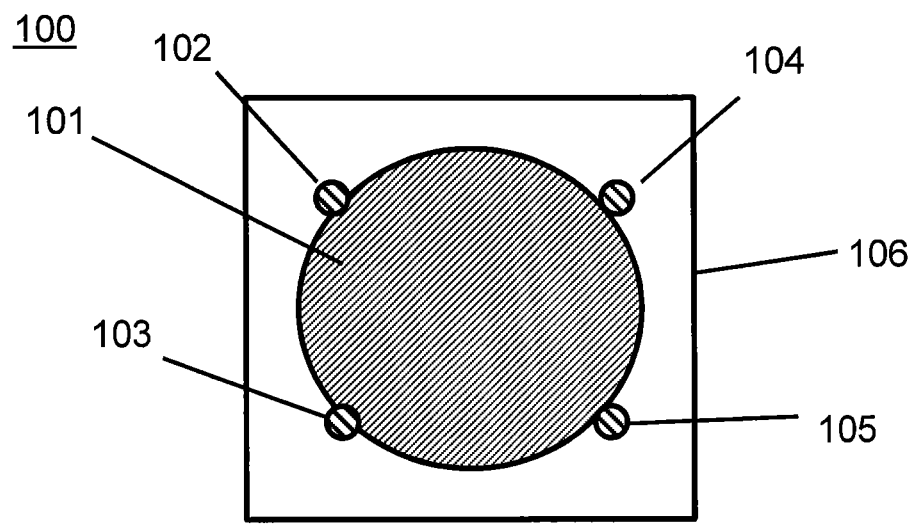
FIG. 1A is a top view of a magnetohydrodynamic reflective cell, according to an embodiment of the present invention.

FIG. 1A is a schematic representation of a top view of a MHD reflective cell 100. An electrically conducting fluid 101 is located on an electrically insulating substrate 106. Electrodes 102, 103, 104, 105 are located near the perimeter of the conducting fluid 101, and are in electrical contact with the conducting fluid 101.

Figure 1B:
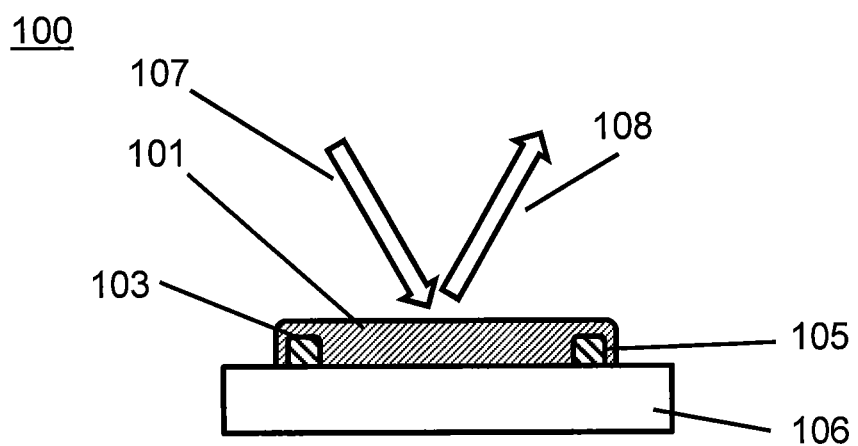
FIG. 1B is a side view of a magnetohydrodynamic reflective cell, according to an embodiment of the present invention.

FIG. 1B is a side view of the MHD reflective cell 100. An incident beam of light 107 is shown, reflecting off the surface of the conducting fluid 101. The reflected beam of light 108 reflects from the surface of the conducting fluid 101.

Figure 2A:
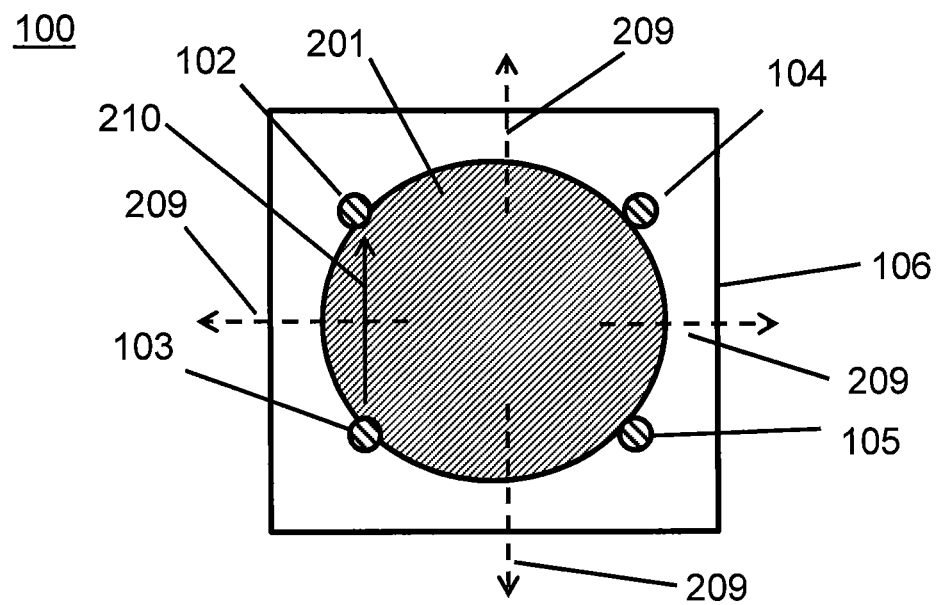
FIG. 2A is a top view of an actuated magnetohydrodynamic reflective cell, according to an embodiment of the present invention.

FIG. 2A is a representation of the MHD reflective cell 100, now actuated. A magnetic field 209 now passes through the materials, created by an external permanent magnet or electromagnet. Electrode 103 is brought to a higher electrical potential than electrode 102, resulting in an electrical current 210 that flows between them.

Figure 2B:
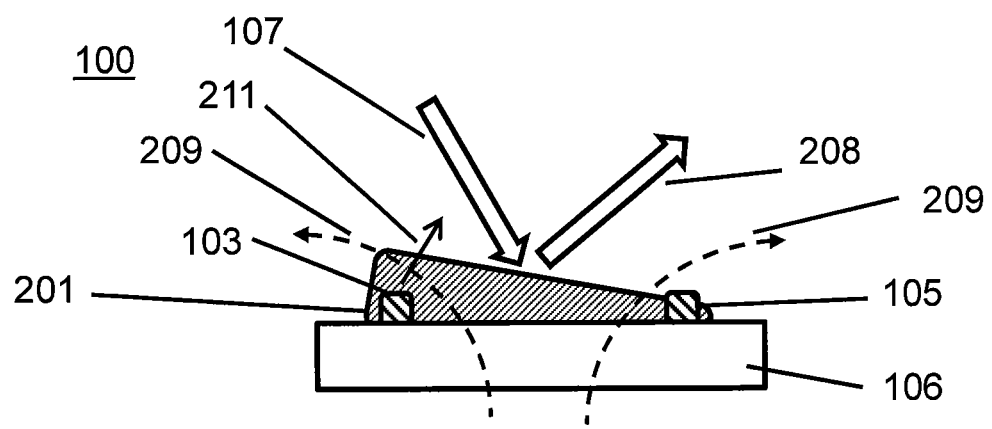
FIG. 2B is a side view of an actuated magnetohydrodynamic reflective cell, according to an embodiment of the present invention.

FIG. 2B is a side view of the actuated MHD reflective cell 100. A Lorentz force 211 is shown, created as the result of the electrical current 210 passing in the presence of a magnetic field 209, with its direction at right angles to both the electrical current 210 and the magnetic field 209. The electrical current 210, magnetic field 209, and Lorentz force 211 are shown for simplicity in the schematic as single vectors, however, each of these are distributed fields passing through their respective mediums. The Lorentz force 211 is a distributed force created in the body of the conductive fluid 201, which perturbs its physical structure by creating internal circulation and fluid movement. The resulting perturbed conductive fluid 201 results in the incident beam 107 striking the surface at an increased angle, resulting in the direction of the outgoing reflected light 208 being directed at a new direction. The combined effect of magnetic field 209, electrical current 210, Lorentz force 211, and resulting perturbed conductive fluid 201 create a controlled optical beam steering device.

The operation and performance of the MHD reflective cell 100 depends on the strength of the applied magnetic field 209, magnitude and direction of the electrical current 210, the overall geometry, the location of the electrodes 102, 103, and the physical properties of the conducting fluid 201. Long term operation of the device depends on the nature of the electrical contact between the electrodes 102, 103, 104, 105, and the conducting fluid 201, as well as the chemical stability of the respective materials. In an embodiment of the present invention the conductive fluid 201 is gallium. In additional embodiments of the present invention the conductive fluid 201 may be alloy of metals such as gallium and tin, gallium and indium, tin and gallium, or gallium, indium, and tin. In additional embodiments, the conductive fluid 201 may be pure liquids or alloys of gallium, indium, tin, mercury, sodium, potassium, and/or cesium. In additional embodiments of the invention the conductive fluid 201 may be ionic liquids or electrolyte solutions including, but not limited to salt solutions, solutions of 1-alkyl-3-methylimidazolium, tetrafluoroborate and/or hexafluorophosphate.

The electrodes 102, 103, 104, 105 must be electrical conductors and chemically compatible with the conductive fluid 201. In an embodiment of the present invention they are composed of copper. In additional embodiments of the present invention they may be composed of pure metals or alloys of components including gold, silver, aluminum, nickel, tungsten, titanium, steel, stainless steel.

Figure 3A:
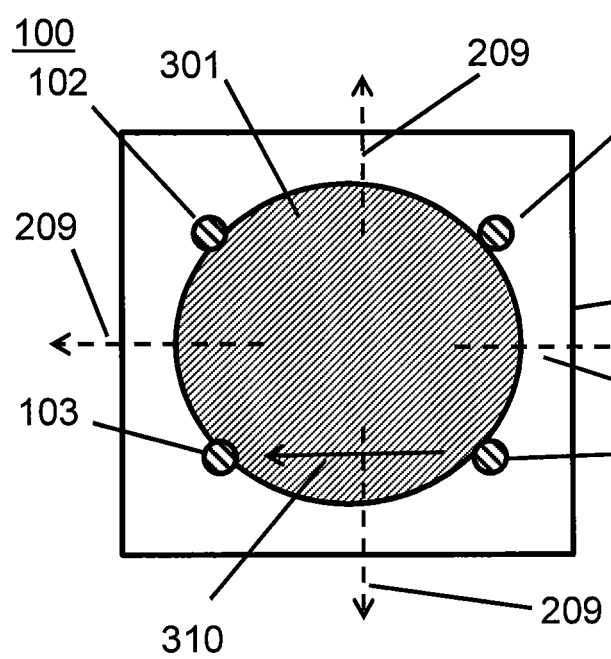
FIG. 3A is a top view of an actuated magnetohydrodynamic reflective cell, according to an embodiment of the present invention.

FIG. 3A is a schematic diagram of the MHD reflective cell 100, with different electrical activation resulting in different angular deflection of the light. In the figure electrodes 105 and 103 are controlled at different electrical potential resulting in an electrical current 310 flowing through the perturbed conductive fluid 301.

Figure 3B:
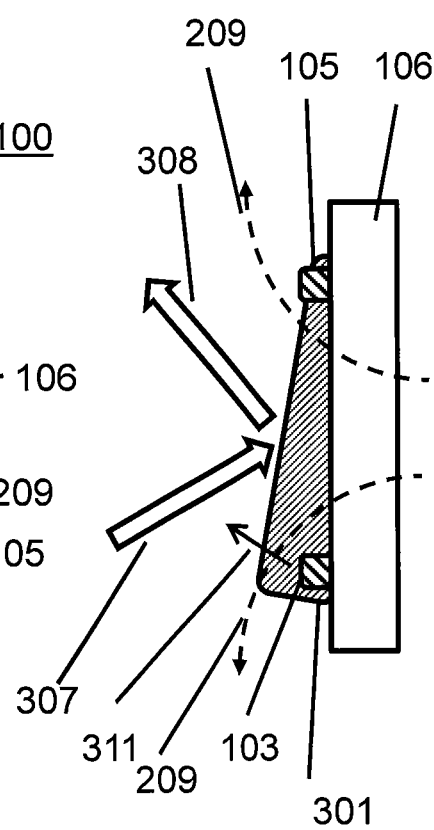
FIG. 3B is a side view of an actuated magnetohydrodynamic reflective cell, according to an embodiment of the present invention.

FIG. 3B is a side view of the MHD reflective cell 100. As a result of the magnetic field 209, a new Lorentz force 311 is activated within the body of the perturbed conductive fluid 301, resulting in fluid flow and surface reconfiguration of the fluid. As a result, the incident light 307 is reflected in a direction orthogonal to the operating condition depicted in FIGS. 2A and 2B. As a result of the ability to drive different levels of current in different directions from multiple electrodes, a two axis controlled mirror system is enabled. In other words, the MHD reflective cell of the present invention is able to direct light in a controlled manner in a wide range of angles in 3D space.

The present invention includes additional configurations of the MHD reflective cell 100 such as the use of more or fewer conductive pins, activating the fluid and creating Lorentz force by driving current between multiple pins at the same time. The resulting Lorentz force may provide forces that swell the portion of the fluid, providing the desired angular change and or a Lorentz force that compresses a region of the fluid, also resulting in an angular change of the surface. Additional embodiments of the invention include controlling the position of the surface of the conducting fluid by either controlling the electrical current, and/or controlling and modulating the spatial distribution and intensity of the magnetic field.

Figure 4A:
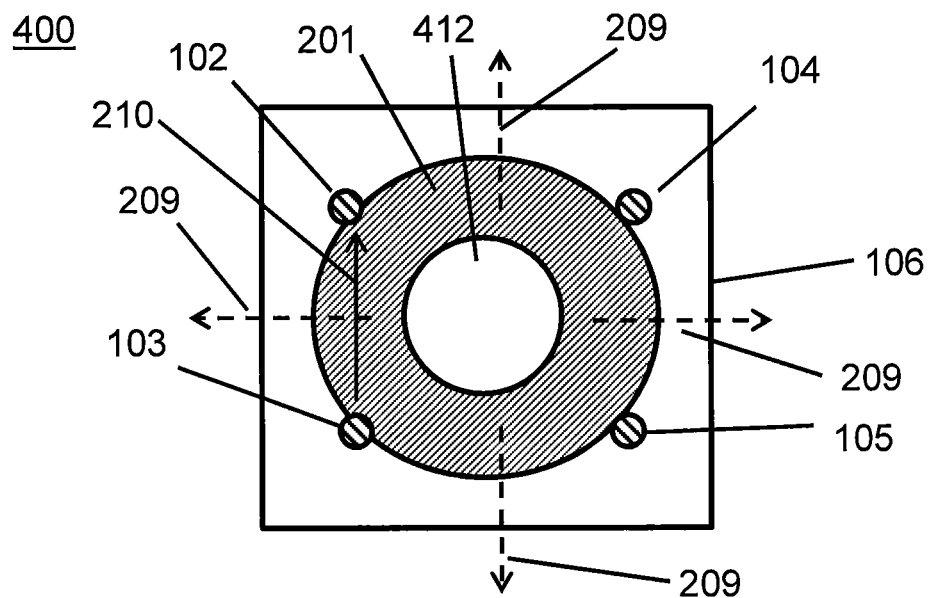
FIG. 4A is a top view of an actuated magnetohydrodynamic reflective cell incorporating a mirror, according to an embodiment of the present invention.

FIG. 4A shows a schematic diagram of a further embodiment of a MHD reflective cell 400 that includes the addition of a solid reflector 412. This solid reflector 412 is in contact with, and in effect floats on the perturbed conductive fluid 201.

Figure 4B:
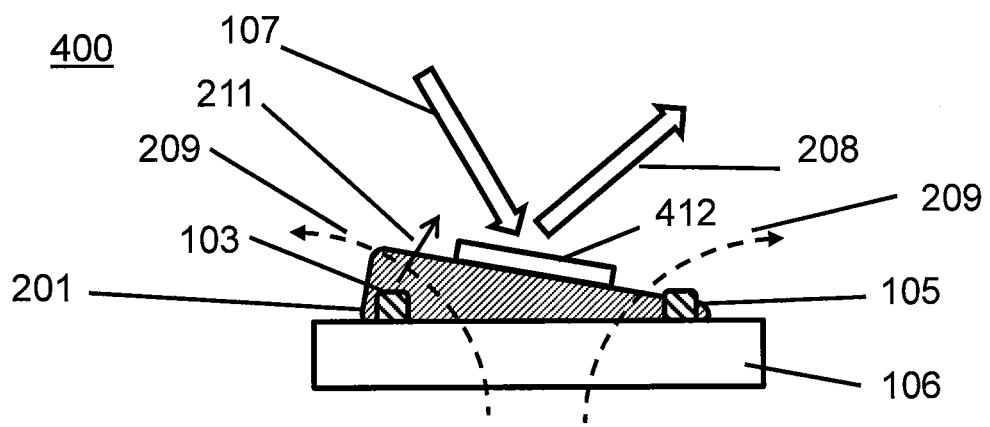
FIG. 4B is a side view of an actuated magnetohydrodynamic reflective cell incorporating a mirror, according to an embodiment of the present invention.

FIG. 4B is a side view of the MHD reflective cell 400, illustrating the solid reflector 412, shown in contact with, and in effect floating on the perturbed conductive fluid 201. The incident beam of light 107 is incident on the solid reflector 412, and the resulting reflected beam of light 208 is directed in free space based on the relative angle of the solid reflector 412, which has its position set by the surface angle of the perturbed fluid 201. As such, this embodiment of the present invention is able to direct a reflected beam of light in a controlled manner in 3D space.

In an embodiment of the present invention the solid reflector 412 serves in cases where the flatness of the perturbed conductive liquid 201 is not sufficient to meet the requirements of the application, or may not have the optical reflective properties needed to reflect enough of the incident beam of light 107. In an embodiment of the present invention the solid reflector 412 is a polished disk of aluminum. In additional embodiments it may be composed of copper, silver, germanium, gold, rhodium or nickel. In additional embodiments the solid reflector 412 is a glass disk that has a metal coating on the surface facing the indecent beam of light 107 to provide a highly reflective surface. This highly reflective coating on the underlying glass disk may be composed of aluminum, copper, silver, germanium, rhodium or nickel, or composed of dielectric multilayer films that provide a reflective surface. In further embodiments of the present invention the glass disk may be composed of borosilicate glass, BK7, fused silica, or quartz. In a preferred embodiment of the present invention the solid reflector 412 is composed of borosilicate glass which readily wets to gallium and gallium alloys such as gallium-indium-tin. As such, the solid reflector makes an intimate physical contact to the conductive fluid 201, and is highly responsive to perturbations in the fluid surface, thereby directing reflected light in a high speed, controlled manner.

Figure 5A:
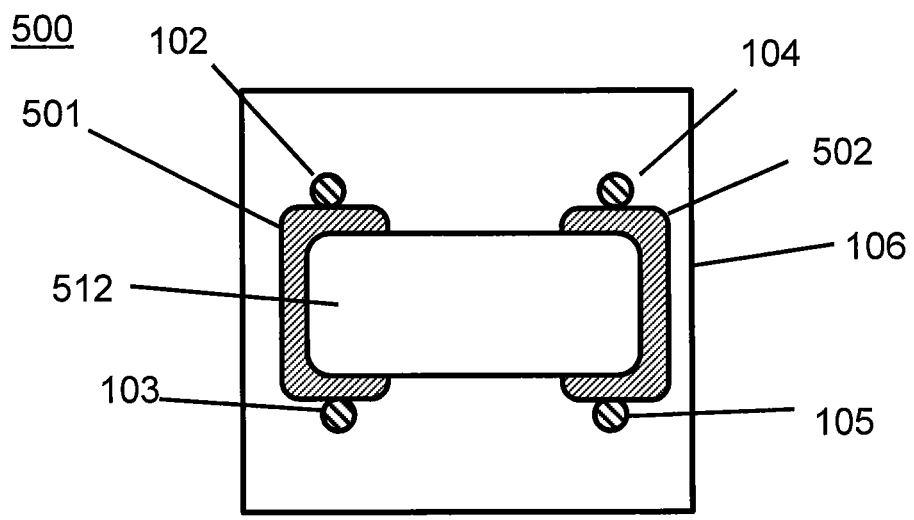
FIG. 5A is a top view of a magnetohydrodynamic reflective cell, according to an embodiment of the present invention.

FIG. 5A is a top view of a schematic diagram depicting another embodiment of the present invention. A conducting fluid region 501 is shown at the left and a conducting fluid region 502 is shown at the right. Both are in contact with a solid reflector 512. Solid conducting fluid region 501 is in electrical contact with electrodes 102 and 103, and conducting fluid 502 is in electrical contact with electrodes 104 and 105. The system is shown on a substrate 106.

Figure 5B:
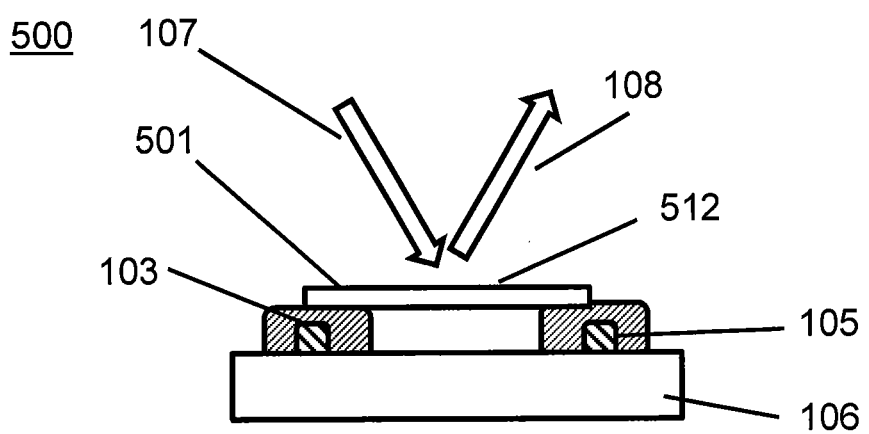
FIG. 5B is a side view of a magnetohydrodynamic reflective cell, according to an embodiment of the present invention.

FIG. 5B shows a side view of the MHD reflective cell of FIG. 5A. The conductive fluid regions 501 and 502 make physical contact to the solid reflector 512, but are not in direct contact with each other. The MHD reflective cell is shown in its un-actuated state, where either no electrical current and/or no magnetic field is present.

Figure 6A:
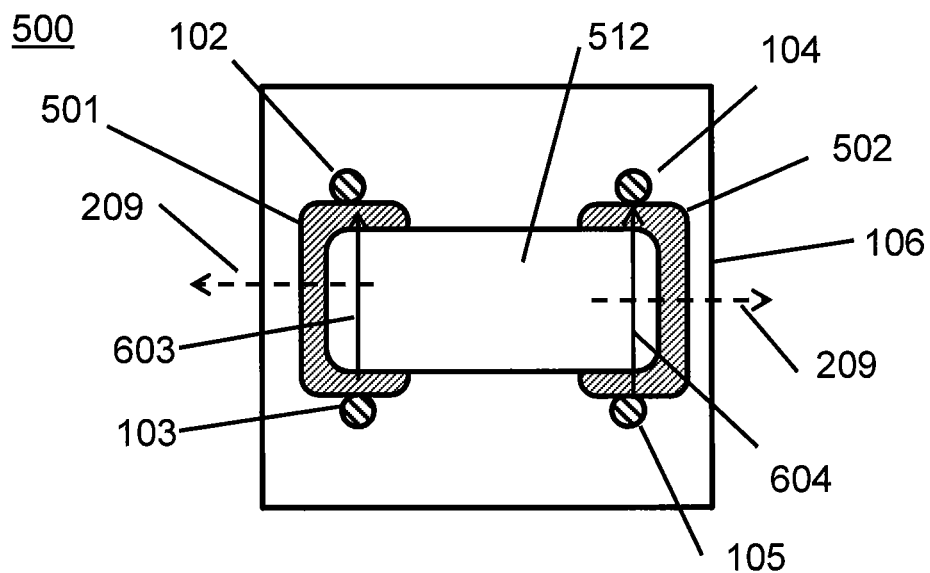
FIG. 6A is a top view of an actuated magnetohydrodynamic reflective cell, according to an embodiment of the present invention.

FIG. 6A is a top view of the MHD reflective cell of FIG. 5A that is now actuated. The actuation is enabled by the creation of an external magnetic field 209 that can be generated by permanent magnets or other electromagnetic means. Electrical current 603 is created by control of the electrical potential of electrodes 103 and 102. Electrical current 604 is created by control of the electrical potential of electrodes 104 and 105. The configuration of the MHD reflective cell of FIG. 5A allows for electrical current 604 and electrical current 603 to flow fully independent of each other since they are not flowing in a common conductive fluid and be electrically isolated from each other.

Figure 6B:
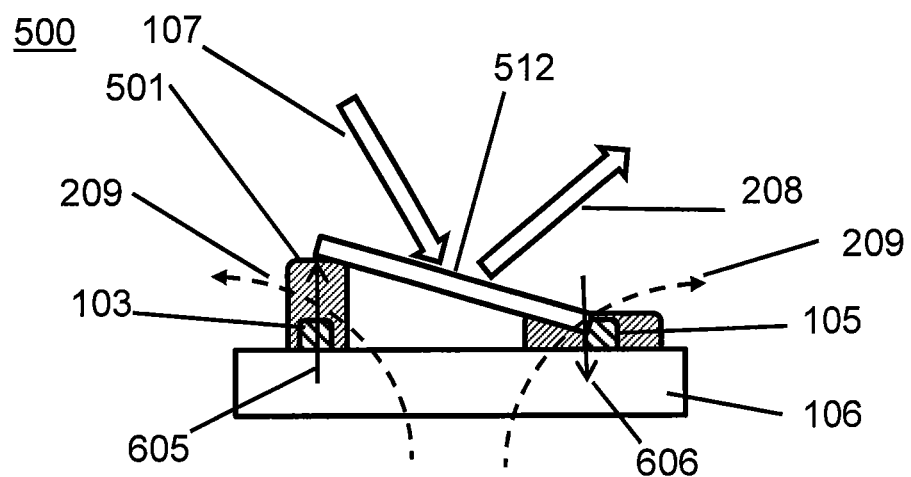
FIG. 6B is a side view of an actuated magnetohydrodynamic reflective cell, according to an embodiment of the present invention.

FIG. 6B is a side view of the MHD reflective cell 500. With the electrical current 603 flowing in the presence of a magnetic field 209, a Lorentz force 605 is created in the bulk of the conducting fluid 501. This Lorentz force 605 is directed away from the substrate 106, causing the conducing fluid 501 to circulate and swell upwards, raising the solid reflector 512. This causes the angle of the reflective solid 512 to change, directing the reflected beam of light 208. Additionally, or alternatively, electrical current 604 may be applied to compliment the induced motion due to electrical current 603. Thus, in the presence of magnetic field 209, a Lorentz force 606 is generated in the direction of the substrate 106, and causes the conductive fluid 502 to circulate and compress down. This results in a change in the angle of the solid reflector 512, thereby directing the reflected beam of light 208 in a controlled direction.

Electrical currents 603 and 604 may be applied individually or in tandem to achieve the desired movement of the solid reflector 512. The direction of the current flows may be reversed, causing the angle of the reflected beam 208 to change, and move in the opposite direction. As such, the MHD reflective cell 500 creates a beam steering device with a single axis, capable to directing light beams in a controlled and deliberate manner.

The materials and construction of the MHD reflective cell 500 are as outlined for previous MHD reflective cells 100 and 400.

Figure 7:
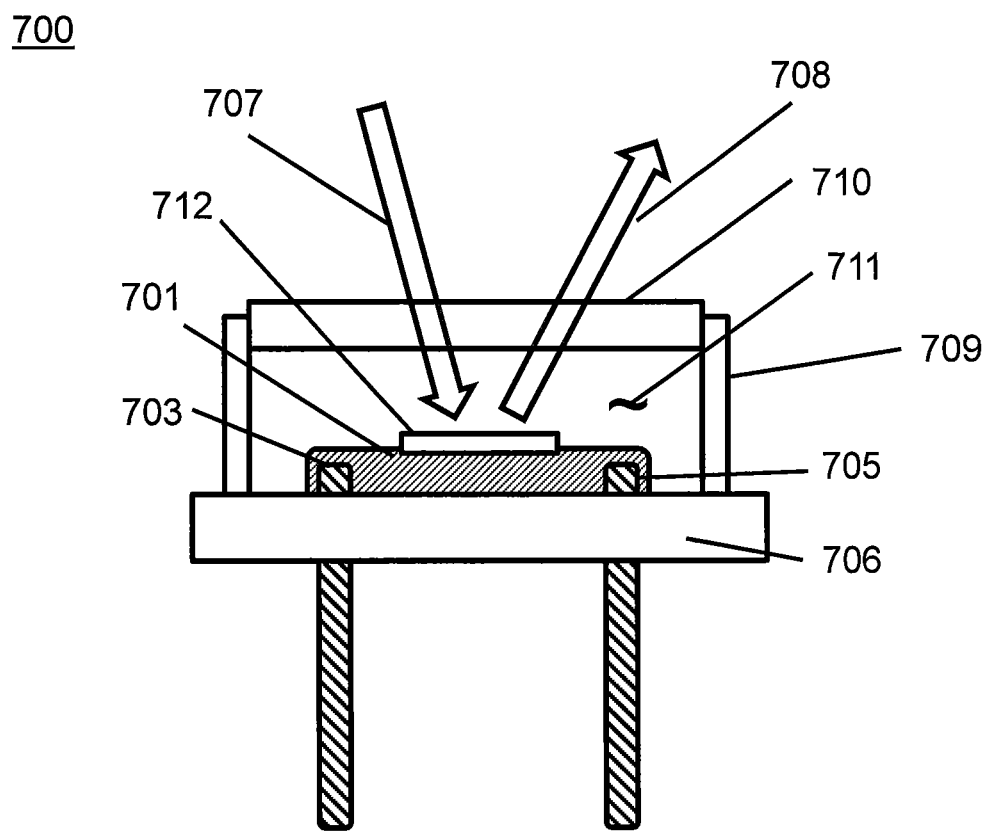
FIG. 7 is a packaged magnetohydrodynamic reflective cell, according to an embodiment of the present invention.

FIG. 7 is a cross sectional schematic diagram of a packaged MHD reflective cell 700. It includes components described in previous figures including a conductive fluid 701 and optionally a solid reflector 712. The substrate is now shown as an electronic package 706, which has the electrical contacts 703 and 705 (and contacts not shown in the cross section) passing through the body of the electronic package 706 in order to be accessed externally. A package lid 709 that includes an integrated window or lens 710, and is sealed to the electronic package 706. The window or lens 710 allows for the incident light 707 to pass through, be reflected by the conducting liquid 701 or solid reflector 712, and pass out of the package as reflected light 708. The packaged MHD reflective cell 700 is hermetic to the outside environment, and contains an internal atmosphere/ambient 711.

In an embodiment of the present invention the MHD reflective cell 700 components that are previously described are composed of materials previously described. The internal atmosphere/ambient may be room air, dry nitrogen, argon, xenon, sulfur hexafluoride or possibly other standard gasses used in phonics packaging. In a further embodiment of the present invention, the internal atmosphere/ambient is a fluid such as, for example, a fluorocarbon-based fluid or silicone oil (e.g., decamethyltetrasiloxane, polydimethylsiloxane).

Key to this embodiment of the present invention is the composition of the internal atmosphere/ambient 711, the conducting fluid 701, and solid reflector 712. In order to ensure that the solid reflector 712 remains in place, intimate contact between the solid reflector 712 and the conducting fluid 701 is maintained, by means of wetting or chemical bonding. Additionally, careful design of the surface tension of the conducting fluid 701, the internal atmosphere/ambient 711, and the solid reflector 712 allow for the position of the materials to be maintained such that the reflective cell 700 remains operational under various operating conditions and orientations with respect to gravity. In addition to material selection, physical scale plays a role in forming this structure in a robust manner. The physical scale, that is the lengths and volumes of the conducting fluid 701, the internal atmosphere/ambient 711, and the solid reflector 712, are key to be maintained such that the forces of surface tension are high with respect to forces of gravity and inertia that would otherwise displace components. In an embodiment of the present invention it has been shown that a solid reflector 712 diameter of less than 5 mm and a conductive fluid 701 body of less than 8 mm in diameter when the internal atmosphere/ambient 711 is a gas, is sufficient to maintain components in place during device operation.

In an additional embodiment of the present invention a method to minimize the potentially damaging effects of inertial forces and gravitational forces on the MHD reflective cell 700 is taught. Effects of these forces is minimized when the relative densities of the components that may move is similar. In other words, gravity can displace a solid or fluid with respect to other solids or fluids in proximity only if there is a relative difference in the effect of gravity on the respective bodies, or a buoyant force. It has been observed that by composing the conducting fluid 701, solid reflector 712, and internal ambient 711 with materials of similar density, buoyancy of any individual component is minimized, minimizing the effects of external forces such as gravity and inertia. In one embodiment of the invention the conducting fluid 701 is composed of 77% sodium and 23% potassium (density 0.88 g/cc), the internal atmosphere is hexane (density 0.65 g/cc), and the solid reflector is a metal coated polypropylene (density 0.85 g/cc).

Figure 8A:
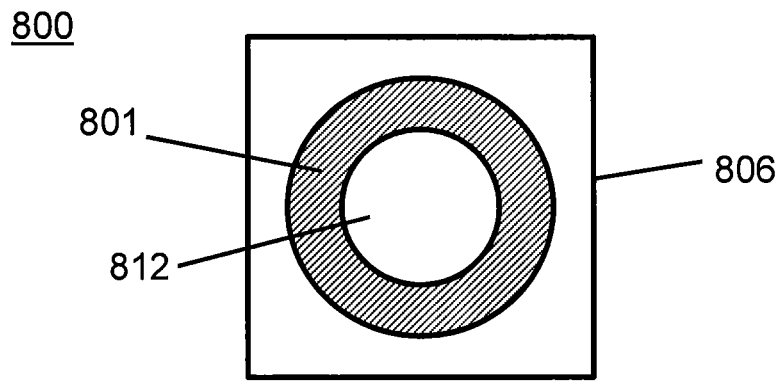
FIG. 8A is a top view of a magnetohydrodynamic reflective cell driven inductively, according to an embodiment of the present invention.

FIG. 8A is a top view of a MHD reflective cell 800. A conductive fluid 801 is shown on a substrate 806, with an optional solid reflector 812 on top of the conductive fluid 801. Objects embedded in the substrate are not show for clarity.

Figure 8B:
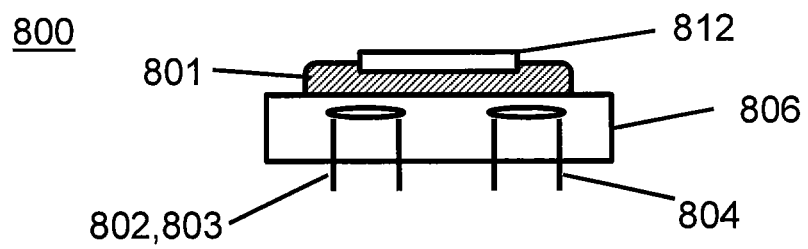
FIG. 8B is a side view of a magnetohydrodynamic reflective cell driven inductively, according to an embodiment of the present invention.

FIG. 8B is a side view of a MHD reflective cell 800. Inductive coil 802, 803, and 804 are located embedded in the substrate, but may be located anywhere in proximity to the conducting fluid 801 while maintaining electrical isolation from the fluid. Inductive coil 803 is behind coil 802, and as such they are not seen independently. The inductive coils 802, 803, and 804 are coils of electrical conductor making at least one loop. As electrical current is passed through these coils a complimentary magnetic field is generated, which in turn induces a Lorentz force and fluid movement in the conducting fluid 801. In embodiment of the present invention the inductive coils 802, 803, and 804 are composed of copper wire with electrically insulating coatings.

Figure 8C:
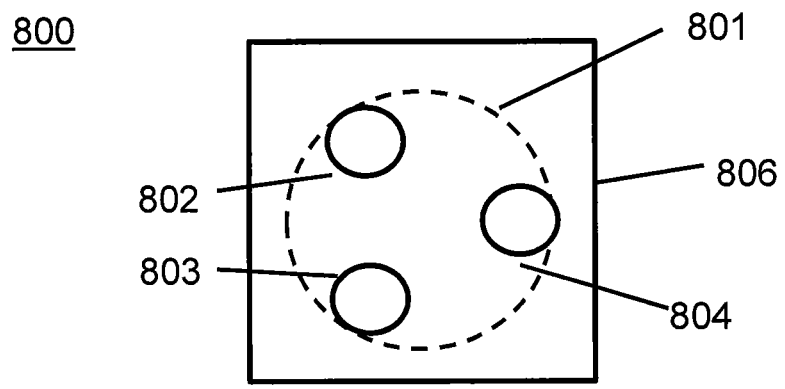
FIG. 8C is a bottom view of a magnetohydrodynamic reflective cell driven inductively, according to an embodiment of the present invention.

FIG. 8C is a bottom view of MHD reflective cell 800. The inductive coils 802, 803, 804, which may be embedded in the substrate 806 are shown for clarity and to provide an illustration of an example of their placement with respect to the conductive fluid 801, shown in hidden lines.

Figure 9:
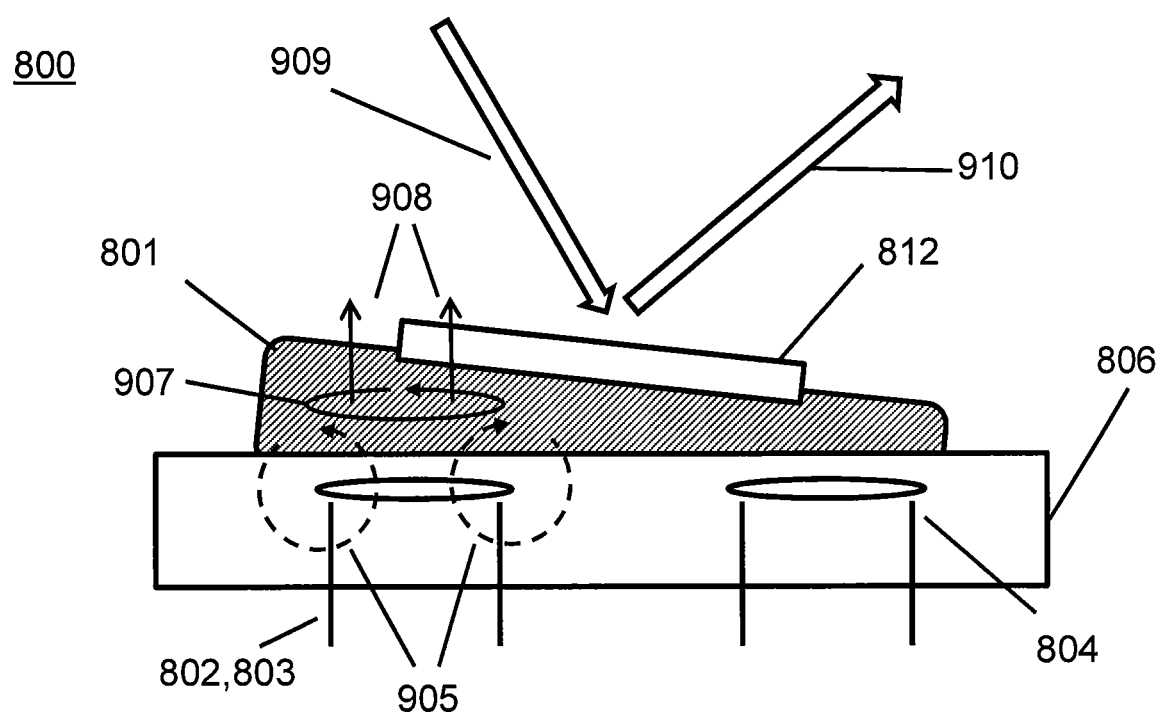
FIG. 9 is a side view of an actuated magnetohydrodynamic reflective cell driven inductively, according to an embodiment of the present invention.

FIG. 9 is a side view of MHD reflective cell 800 where selective coils are energized. As alternating electrical current is applied to inductive coils 802 and 803, a toroidal magnetic field 905 is induced surrounding the coils 802 and 803. This induced magnetic field 905 in turn induces a circulating response electrical current 907 in the conductive fluid 801. Lorentz forces 908 result from this electrical current 907 and magnetic field 905 creating fluid flow and swelling the conductive fluid 801 in regions above the coils. This provides are reconfiguration of the fluid body and tilts the solid reflector 812 in a desired angle. Incident light 909 reflects and is directed in a controllable manner as reflected light 910.

FIG. 9 illustrates a configuration with three coils located equidistance around the perimeter of a conducing fluid, providing the minimum number of coils to allow movement to be induced in the mirror at all angles. By energizing any two of the three coils by different amounts, movement in the mirror can be induced to direct light to any degree in both x and y directions.

Figure 10A:
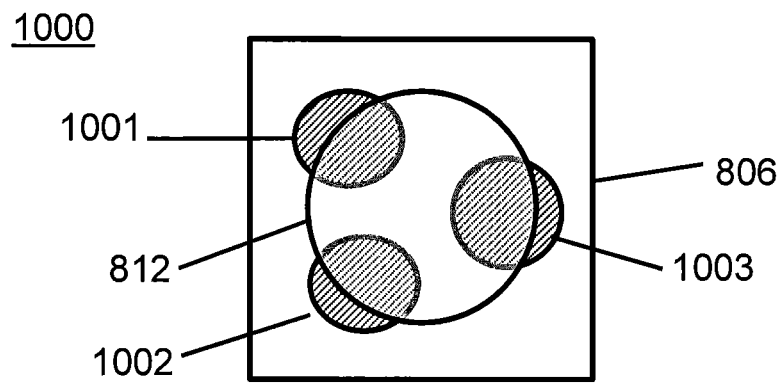
FIG. 10A is a top view of a magnetohydrodynamic reflective cell driven inductively, according to an embodiment of the present invention.

FIG. 10A is a top view of a MHD cell 1000. Conducting fluid is located in independent regions in close proximity to individual coils. Conducting fluid 1001, 1002, 1003 are shown, independent of each other and in contact with a single solid reflector 812.

Figure 10B:
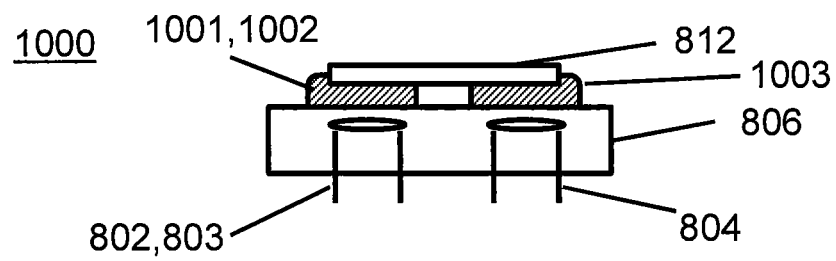
FIG. 10B is a side view of a magnetohydrodynamic reflective cell driven inductively, according to an embodiment of the present invention.

FIG. 10B is a side view of MHD cell 1000. Conducting fluid regions 1001, 1002, and 1003 are shown, located in close proximity with their respective inductive coils 802, 803, and 804. By energizing each coil the independent conducting fluid region above it is actuated, swelling vertically and displacing the mirror. These three coils operated in tandem allow for controlling the solid reflector 812 in arbitrary angles as desired.

Figure 10C:
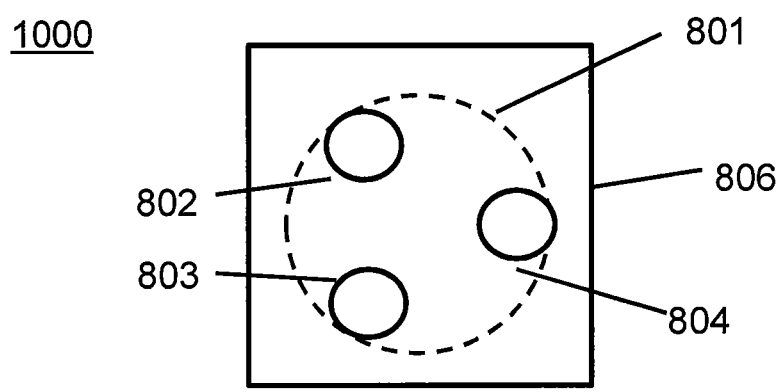
FIG. 10C is a bottom view of a magnetohydrodynamic reflective cell driven inductively, according to an embodiment of the present invention.

FIG. 10C is a bottom view showing the coils 802, 803, 804, which are embedded in the substrate 806 or located in close proximity to the fluid but electrically isolated from the fluid.

The solid reflector is desirably configured to have minimal buoyancy relative to the conducting fluid. There are numerous means by which this is achievable. While a bulk material with a matching density is desirably utilized, it is also possible to adjust the effective density of a material by selective incorporation of entrapped vapor reservoirs. This trapping may be achieved by numerous means.

Figure 11A:
FIG. 11A through 11E are side views of a process to fabricate reflective mirrors for a magnetohydrodynamic reflective cell, according to an embodiment of the present invention.

A process by which the vapor trapping can be achieved is illustrated in FIG. 11A-11E. FIG. 11A shows a silicon-on-insulator (SOI) substrate 1100 comprised of a handle wafer of silicon 1101 and a device layer of silicon 1102, separated by a buried oxide layer 1103. The thickness of the device layer 1102 is determined based on the desired thickness of the final solid reflector (e.g., silicon mirror).

Figure 11B:
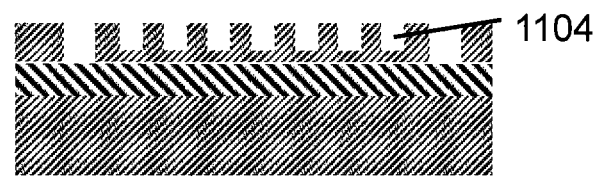
Figure 11C:
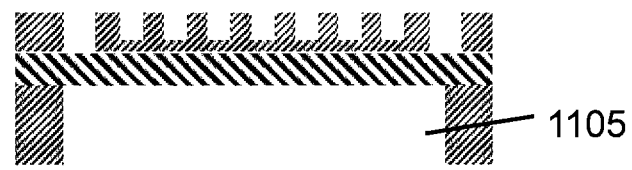
Figure 11D:
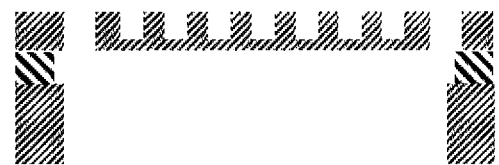
Figure 11E:

In process step shown in FIG. 11B, two deep reactive ion etching steps are utilized: one cuts through the entire device layer 1102, patterning the outside shape of the reflector and attach points. The second etch cuts through most of the device layer 1102 but stops short, allowing for the creation of gas filled voids/gaps 1104 that reduce the mass of the mirror without significantly affecting stiffness. These thin gaps 1104, filled with air (or another gas) serve a second critical purpose. By design, the width of an air gap is such that it will not be filled with liquid when the reflector is installed in the fluid chambers because the vapor is constrained by surface tension. As such, the vapor gaps 1104 and the silicon solid exhibit an effective density that can be designed to at least nearly match the density of the fluids, resulting in a neutrally buoyant reflector/mirror which is a composite of silicon and air. In the process step shown in FIG. 11C the back side handle wafer is selectively removed in the area 1105 that will become the mirror. In the process step shown in FIG. 11D, the buried oxide layer 1104 is removed, freeing the mirror structure, now suspended from the rest of the wafer only by thin temporary attach stringers (not shown). In the process step shown in FIG. 11E a thin reflective coating 1106 is applied from the back side of the wafer using evaporation or sputtering. In this method, a silicon based reflector/mirror of arbitrary thickness and diameter can be realized with designed weight saving structures.

Silicon mirrors with voids engineered to entrap vapor by way of interaction with surface energy may be constructed by other methods. Photochemical etching, chemical etching, lithography, or ion beam etching steps may be combined with one another to fabricate structures with hydrophilic or hydrophobic structures with high surface area to volume ratios, such as porous silicon, micro trenches, and coherent porous silicon.

An alternative method proposed for yielding flat, large reflective mirrors is to produce them from metal coated polymer materials such as acrylic. Aluminum coated acrylic mirrors are available as lightweight, low cost alternative to glass mirrors. In one embodiment, a mirror comprised of flat acrylic material is coated with the appropriate reflective coating. The mirror is then realized from the flat sheet by laser cutting or water jet cutting the mirror profile from the sheet.

Polymer reflectors may be similarly fabricated with structures engineered to entrap vapors with high surface energies. Such structures can be fabricated in polymer materials using forming processes such as hot embossing, stamping, roll to roll embossing, or micro embossing using solid tools such as silicon, steel, or other tooling materials.

Vapors may be incorporated into the mirror structures via entrapment in enclosed pores, such as exist in closed cells foams. In this case, a combination of surface energies and material structure functions to retain low density vapor in the mirror structure. In one embodiment, the exterior envelope surfaces of closed or open celled foams may be encased in bulk material to macroscopically reinforce vapor entrapment barriers. Closed and open celled foams can be made from a variety of polymers, organic materials, and metals, including aluminum.

In one embodiment of the invention, the MHD includes a closed loop control system incorporating a sensor, providing a means of direct positional readout which can be monitored to modify the control currents and adjust the final position to a stable position. Such control systems provide additional stability when operating in environments with large fluctuations in ambient temperatures or other external factors. Positional readout may be utilized by higher level control systems and signal processing algorithms to increase accuracy of the higher level control system.

In one embodiment of the invention, the electrical resistance between the electrodes is monitored utilizing external circuitry. The resistance can be a direct function of mirror position, as the moving mirror modifies the conductive pathway through the fluid.

In another embodiment of the invention, optical sources and sensors are utilized to monitor the source following reflection from the MHD reflective cell. The sources may have distinct optical properties and optical pathways compared to the beam which is being actively steered by the MHD cell. The optical system may be configured to be above or below the mirror.

Figure 12A:
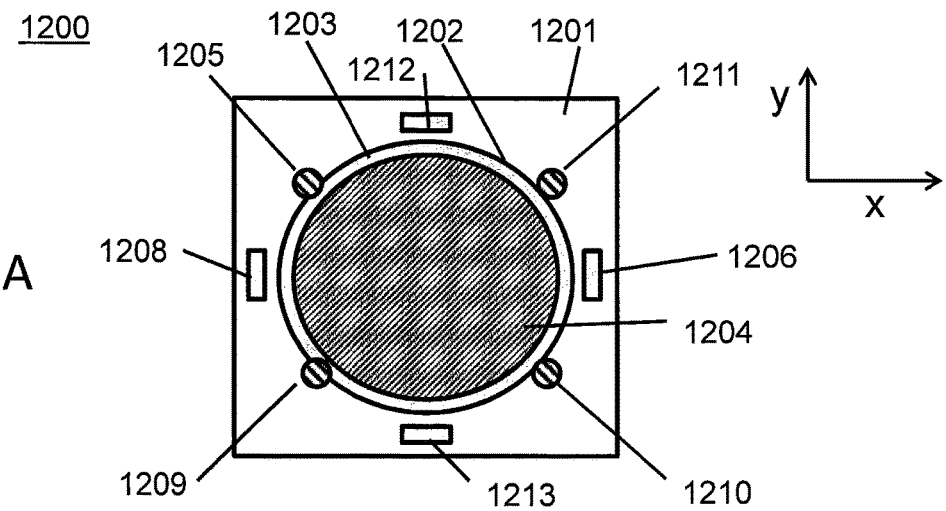
FIG. 12A is a top view of an actuated magnetohydrodynamic reflective cell incorporating a mirror and magnetic sensors, according to an embodiment of the present invention.

In another embodiment of the invention, magnetic sensors are utilized to monitor the mirror position, since the displaced conductive fluid influences the amount of magnetic field detected. FIG. 12A shows an MHD reflective cell 1200 comprised of a substrate 1201 with a hemispherical cavity 1202 in it that contains an electrically conductive fluid 1203. A mirror 1204 is shown in physical contact with fluid 1203. Four electrodes 1205, 1209, 1211 and 1210 are formed on the substrate and in contact with the conductive fluid. Four magnetic sensors 1206, 1208, 1212, and 1213 are illustrated at 45° from the electrodes. The second, optically transparent fluid is not shown, but is located above the mirror 1204, covered by an upper window.

Figure 12B:
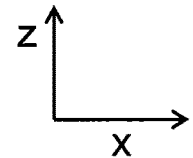
FIG. 12B is a side view of an actuated magnetohydrodynamic reflective cell incorporating a mirror and magnetic sensors, according to an embodiment of the present invention.
Figure 12B:
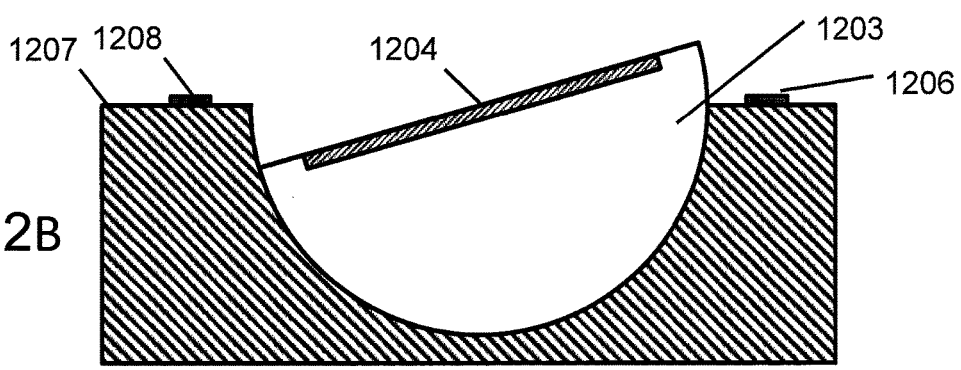

In the cross sectional view of the MHD cell in FIG. 12B, the mirror 1204 is tilted with respect to the substrate top surface 1207 by a rotation axis parallel with the y axis. This rotation occurs when, for instance, electrical current flows from electrodes 1205 and 1211 to 1209 and 1210, which may create a Lorentz force in the fluid that raises the fluid 1205 and mirror 1204 at the right and drops the fluid at the left. As seen in the cross sectional area, this mirror and fluid displacement creates a much larger cross section of conductive fluid at the right, near sensor 1206. Likewise, the volume of conductive fluid at the left near magnetic sensor 1208 is greatly reduced. As such, magnetic field induced by currents flowing from electrodes 1205 and 1211 towards 1210 and 1209 will result in a much stronger magnetic flux sensed at sensor 1206 than at sensor 1208. A direct, monotonic relationship may exist between the normalized flux difference and the angle of rotation. A similar relationship exists for rotation about the x axis, and the normalized difference signal provides a robust and sensitive means to encode rotations about the two axes. The control signals can be separated from the drive signals and the associated magnetic flux created as illustrated in the figure below.

Figure 13:
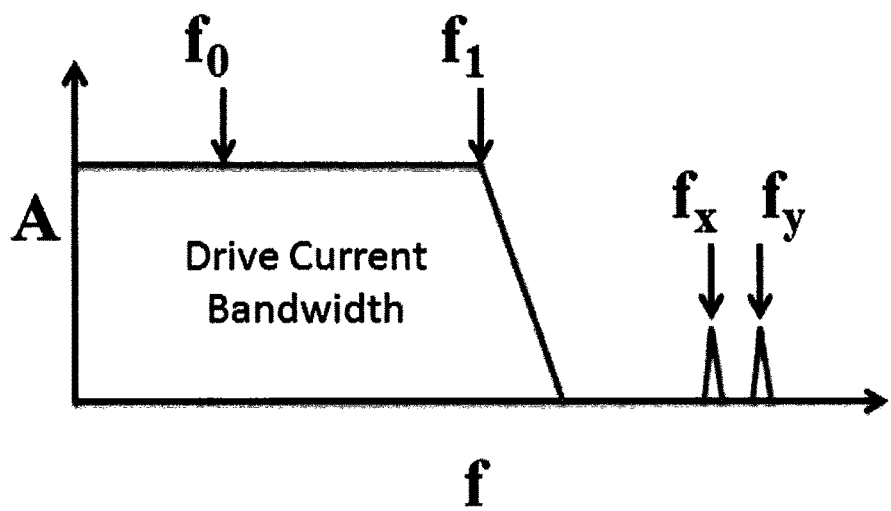
FIG. 13 is an amplitude versus frequency response for a magnetohydrodynamic reflective cell incorporating a mirror and magnetic sensors, according to an embodiment of the present invention.

In FIG. 13, the signal frequency is shown in the horizontal axis and the relative amplitude of signal is shown in the vertical axis. Frequency f0 represents the maximum frequency of mirror operation. Drive currents are applied from DC to a frequency well above the drive frequency to allow for high speed control of the system. The maximum drive current bandwidth is illustrated in FIG. 13 as f1. In order to have independent, high sensitivity magnetic readings of position, high frequency, low amperage, constant AC current is passed for each axis at frequencies fx and fy. These are measured using narrow band techniques, and create magnetic field signals that are measured by the sensors, providing a measure of mirror angle.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An optical beam steering device, comprising:
    a first electrically conductive fluid comprising a material that deforms in response to application of a first magnetic field and/or a first electric field thereto; and
    a non-fluid substrate having an optically reflective surface thereon, on said first electrically conductive fluid, said non-fluid substrate comprising a material that maintains its shape in response to the application of the first magnetic field and/or the first electric field;
    wherein said first electrically conductive fluid and said non-fluid substrate operate collectively as an at least 2-axis controlled mirror responsive to the first magnetic field and/or the first electric field.

2. The device of claim 1, wherein said first electrically conductive fluid comprises an optically reflective material.

3. The device of claim 1, further comprising a second electrically conductive fluid having a shape that deforms in response to application of a second magnetic field and/or a second electric field thereto, adjacent said first electrically conductive fluid.

4. The device of claim 3, wherein the non-fluid substrate extends on said first and second electrically conductive fluids.

5. The device of claim 1, further comprising:
    an electrically insulating substrate having said first electrically conductive fluid thereon; and
    a plurality of electrodes electrically coupled to said first electrically conductive fluid.

6. The device of claim 1, wherein the non-fluid substrate is selected from a group consisting of polished metals and substrates having one or more optically reflective materials thereon.

7. The device of claim 1, further comprising a sealed package containing said first electrically conductive fluid and the non-fluid substrate therein, said sealed package comprising a lens/window configured to support passage of incident and reflected light to and from the optically reflective surface.

8. The device of claim 1, further comprising a sealed package containing said first electrically conductive fluid, the non-fluid substrate and an ambient therein, which at least partially surrounds said first electrically conductive fluid and the non-fluid substrate.

9. The device of claim 8, wherein said first electrically conductive fluid, the non-fluid substrate and the ambient are collectively configured to yield a substantially neutrally buoyant condition between components within the sealed package.

10. The device of claim 1, wherein the non-fluid substrate is configured to have an effective density within ±30% of an effective density of said first electrically conductive fluid.

11. The device of claim 9, wherein the non-fluid substrate is shaped and sized within the ambient to have an effective density within ±20% of an effective density of said first electrically conductive fluid.

12. An optical beam steering device, comprising:
    a first electrically conductive fluid having an optically reflective surface thereon, said first electrically conductive fluid comprising a material that deforms in response to application of a first magnetic field and/or a first electric field thereto;
    an electrically insulating substrate having said first electrically conductive fluid thereon; and
    at least one inductive coil on said electrically insulating substrate, extending opposite said first electrically conductive fluid.

13. The device of claim 12, wherein said at least one inductive coil comprises a plurality of independently-controllable inductive coils extending opposite respective portions of said first electrically conductive fluid.

14. An optical beam steering device, comprising:
    a substrate having at least one electrically conductive fluid thereon, which deforms in response to a concurrent application of a magnetic field and electric current thereto;
    a sealed package containing said at least one electrically conductive fluid, said sealed package comprising a lens/window configured to support passage of incident light to the at least one electrically conductive fluid;
    wherein said at least one electrically conductive fluid and an ambient within the sealed package that at least partially surrounds said at least one electrically conductive fluid are collectively configured to yield a substantially neutrally buoyant condition between components within the sealed package; and
    wherein the at least partially surrounding ambient is configured to have an effective density within ±20% of an effective density of said at least one electrically conductive fluid.

15. The device of claim 14, wherein the at least one electrically conductive fluid comprises a material selected from a group consisting of gallium, alloys comprising gallium, and alkali metals comprising sodium and potassium.

* * * * *